March 1, 1960 W. H. KOLBE 2,926,755
GEAR LUBRICATING MECHANISM
Filed July 17, 1958
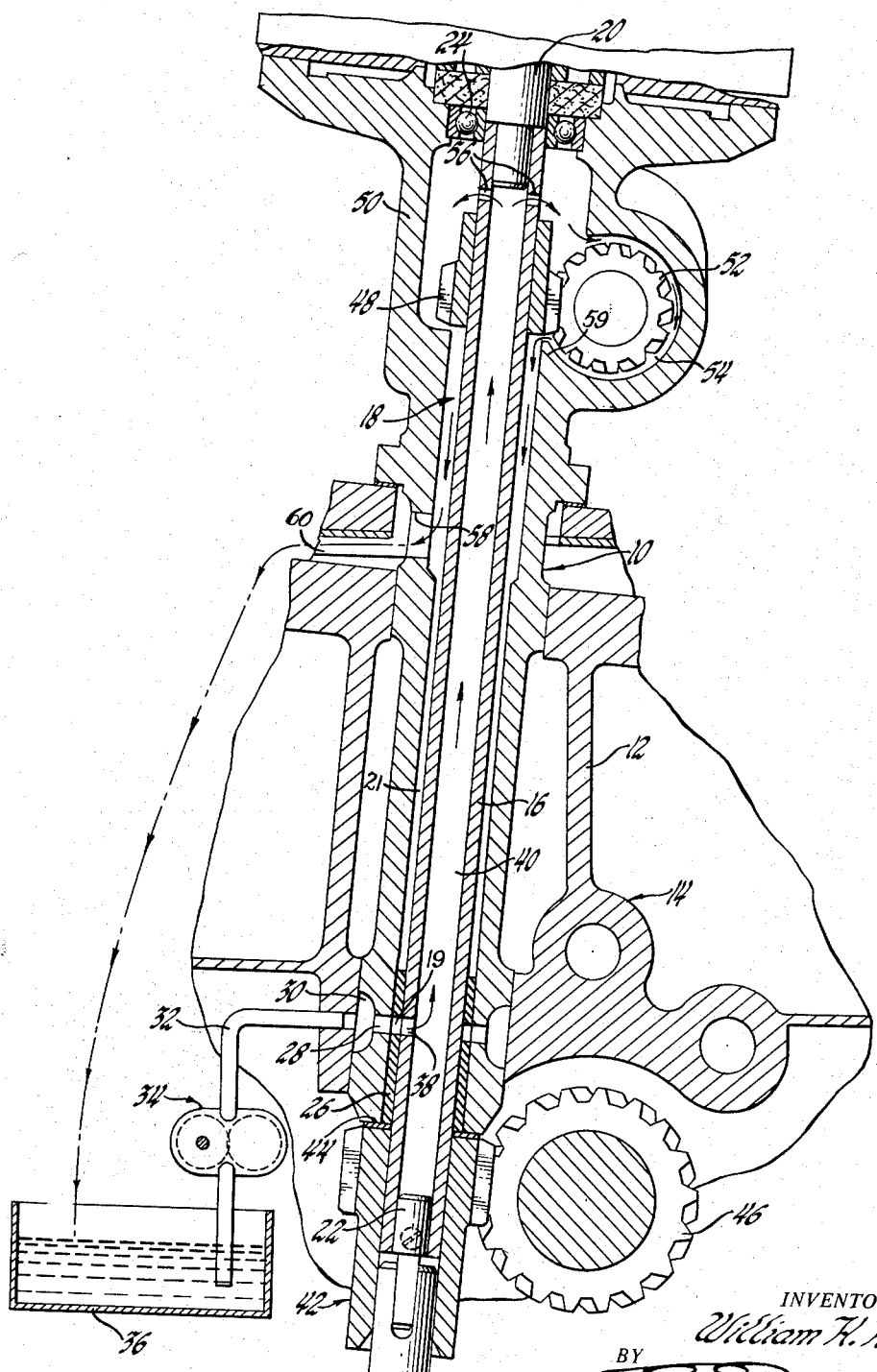
INVENTOR.
William H. Kolbe
BY
R. F. Barnard
ATTORNEY

United States Patent Office 2,926,755
Patented Mar. 1, 1960

2,926,755
GEAR LUBRICATING MECHANISM

William H. Kolbe, Birmingham, Mich., assignor to General Motors Corporation, Detroit, Mich., a corporation of Delaware Application July 17, 1958, Serial No. 749,230

1 Claim. (Cl. 184—6)

The present invention relates to a mechanism for lubricating gear members in such away as to avoid the necessity for external tubes or conduits. More specifically, the lubricating mechanism is designed for use with an auxiliary drive mechanism normally associated with an external combustion engine.

In lubricating gear drive mechanisms it is common to utilize external tubing to deliver lubricant to and remove the same from the components to be lubricated particularly where it is desired to be assured that lubricant will reach parts of the mechanism remote from the lubricant supply. This type of an arrangement is particularly necessary where the parts are arranged in such a way as to preclude satisfactory lubrication by means such as splashing or other simple methods of lubrication.

In the present device the drive mechanism components have been so constructed and arranged that the lubricant is supplied under pressure and transmitted through the components themselves to the various points to be lubricated after which the lubricant is once again returned to a sump.

While the subject device has general utility, it is particularly adapted for use with a drive mechanism in which a plurality of obliquely related shafts are employed and further, in which certain coacting gear members are mounted on said shafts at points remote from the source of lubricant. In the present device a substantially upright hollow drive shaft is provided having a gear member at the upper end thereof adapted to mesh with a similar gear member mounted on a rotative axis generally normal to the axis of said shaft. The latter gear is mounted in a cavity to which lubricant is supplied from the hollow shaft, the latter which includes means to deliver the lubricant to the cavity in such a way that the associated gears are fully lubricated by a continually flowing lubricant.

Other objects and advantages of the present invention will be apparent from a perusal of the detailed description which follows.

The drawing is a sectional view of a drive mechanism embodying the subject invention.

While the present invention is applicable to many types of drive mechanism, for the sake of illustration, it has been shown as applied to an auxiliary drive mechanism for an internal combustion engine.

A drive casing is shown generally at 10 and is suitably fixed within a portion 12 of an engine block 14. A hollow shaft 16 is rotatably supported within casing 10 by bearings 24 and 26 and is radially spaced therefrom to provide an annular cylindrical space 18. Bearing 26 divides annular space 18 into inlet and outlet chambers 19 and 21. The ends of shaft 16 are blocked by plugs 20 and 22. A series of radial holes 28 in casing 10 and bearing 26 are supplied with lubricant through an annular chamber 30. A passage 32 supplies lubricant under pressure from the engine lubricant pump 34 feeding from the engine lubricant sump 36.

A radial port 38 sized to meter the lubricant is formed in shaft 16 and communicates lubricant inlet holes 28 through inlet chamber 19 with the longitudinal passage 40 extending the length of the shaft. A gear and sleeve member 42 is fixed to shaft 16. The gear portion of member 42 coacts with a power input gear member 46 adapted to be driven in proportion to engine speed.

A gear member 48 is fixed to the upper end of shaft 16 and is disposed within an enlarged portion 50 of casing 10. Gear 48 is adapted to coact with a gear member 52, the rotative axis of which is in general disposed at 90° to the rotative axis of shaft 16. Gear 52 is adapted to provide a power take-off for driving any suitable component such as a pump for the fuel system.

Casing 10 is suitably enlarged to provide a cavity or reservoir 54 within which the gear member 52 is adapted to rotate.

A plurality of radial ports 56 are formed in the upper end of shaft 16 above gear member 48 and are adapted to deliver lubricant to casing portion 50. Lubricant from ports 56 will be picked up by the rotation of gear 52 and be carried into cavity 54. Thus, cavity 54 is continuously maintained full of lubricant whereby gear 52 will be continually rotating through a lubricant bath which will insure adequate lubrication between that gear and gear 48.

A continuous flow of lubricant through cavity 54 is assured by the rotation of gear 52 which causes the lubricant to spill over an edge 56 of the cavity into outlet chamber 21. Any suitable opening or openings 58 may be provided in casing 10 between spill edge 59 and seal 24 which permits the lubricant within chamber 21 to flow out of the casing and be returned to sump 36 through a conduit 60.

The intended scope of the present invention is set forth in the appended claim.

I claim:

A lubricating mechanism comprising a casing, a hollow shaft member including a longitudinally extending passage therethrough, said casing and shaft coacting to define a longitudinally extending annular space therebetween, a first gear member fixed for rotation with said shaft and disposed at one end of said annular space, a cavity formed in said casing proximate said gear member, a second gear member rotatably disposed in said cavity and adapted to mesh with the first gear member, means dividing said annular space into inlet and outlet chambers, first port means communicating the inlet chamber with the interior of said shaft member, second port means in said shaft and disposed above said cavity for continuously delivering lubricant from the interior of said shaft to the cavity, means for continuously supplying lubricant to the inlet chamber, said latter means including a sump, said cavity openly communicating with the outlet chamber, conduit means communicating the outlet chamber with the sump to return excess lubricant to said sump, a third gear member fixed to said shaft, and means for driving said third gear to rotate said shaft.

References Cited in the file of this patent

UNITED STATES PATENTS

| 1,469,063 | Wills | Sept. 25, 1923 |
| 1,779,912 | MacPherson | Oct. 28, 1930 |

FOREIGN PATENTS

| 879,935 | Germany | June 18, 1953 |

UNITED STATES PATENT OFFICE

CERTIFICATE OF CORRECTION

Patent No. 2,926,755                           March 1, 1960

William H. Kolbe

It is hereby certified that error appears in the printed specification of the above numbered patent requiring correction and that the said Letters Patent should read as corrected below.

Column 1, lines 19 and 20, for "external" read -- internal --

Signed and sealed this 13th day of September 1960.

(SEAL)
Attest:

KARL H. AXLINE
Attesting Officer

ROBERT C. WATSON
Commissioner of Patents